United States Patent [19]

Ueda et al.

[11] Patent Number: 4,535,272
[45] Date of Patent: Aug. 13, 1985

[54] IMAGE DISPLAY APPARATUS

[75] Inventors: Minoru Ueda, Takatsuki; Sadahiro Iyehara, Suita; Mitsuya Masuda, Kyoto; Shizuo Inohara, Toyonaka; Keisuke Yamamoto, Ibaraki, all of Japan

[73] Assignee: Matsushita Electric Industrial Co., Ltd., Kadoma, Japan

[21] Appl. No.: 439,548

[22] Filed: Nov. 5, 1982

[30] Foreign Application Priority Data

Nov. 16, 1981 [JP] Japan ................................ 56-183555
Oct. 1, 1982 [JP] Japan ................................ 57-173425
Oct. 5, 1982 [JP] Japan ................................ 57-175517
Oct. 5, 1982 [JP] Japan ................................ 57-175518

[51] Int. Cl.$^3$ ........................ H01J 29/70; H01J 29/72
[52] U.S. Cl. ..................................... 315/366; 313/422
[58] Field of Search ................ 315/366, 397, 398; 313/422, 409, 416, 441, 446

[56] References Cited

U.S. PATENT DOCUMENTS 4,341,980 7/1982 Noguchi et al. ..................... 313/409

Primary Examiner—Theodore M. Blum
Attorney, Agent, or Firm—Cushman, Darby & Cushman

[57] ABSTRACT

The video image display apparatus of flat tube type comprising
a phosphor screen, an electron beam source having a predetermined number (15) of line cathodes for in turn emitting said predetermined number of horizontal rows of electron beams, each row having a second predetermined number (320) of rod shaped electron beams,
horizontal deflection means for horizontally deflection of the electron beams,
vertical deflection means for vertical deflections of the electron beams of the horizontal rows,
switch pair means of said predetermined number, each switch pair means comprises each-other oppositely working first switching means and second switching means, in each switch pair means the first switching means switches cathode heating current and the second switching means switches cathode bias voltage to bias a selected cathode in turn to enable electron emission, the switch pair means being controlled by switch control signal in turn impressed thereto.

17 Claims, 11 Drawing Figures

IMAGE DISPLAY APPARATUS

BACKGROUND OF THE INVENTION

1. Field of the Invention

The present invention relates to an improvement in an image display apparatus comprising a flat cathode-ray tube with a number of line cathodes.

More particularly, the present invention concerns an image display apparatus wherein its display screen is divided into a plural number of segments in the vertical direction, and for every those segments one respective electron beam is provided, and in those segments a plural number of horizontal lines are displayed by means of deflecting those respective electron beams in the vertical direction, and each segment has plural number of subsegments or red, green and blue phosphor regions disposed in horizontal direction along which horizontally divided electron beams scan in horizontal direction and constitutes the horizontal lines, thereby, as a whole, a television picture image is displayed.

2. Description of the Prior Art

Hitherto, for an image display apparatus for a television set, a cathode-ray tube having three electron guns or a single electron gun set in a neck part of a bulky cone shaped vacuum enclosure has been used for long time. The shortcoming of the conventional cathode ray tube is a large depth in comparison with the size of the screen face, disabling to provide a flat and compact television set. Though EL display apparatus, plasma display apparatus or liquid crystal display apparatus has been developed, they are not sufficiently usable for practical use because they have problems in their brightness and contrast.

Therefore, intending to obtain an apparatus wherein color television picture images can be displayed by a flat-shaped display device using electron beams, a novel display device has been proposed in a Japanese Patent Application, Sho 56-20618, which was applied by the present applicants. The patent application mentioned above in such that the display plane on a screen of the device is divided into a plural number of segments in the vertical direction, and to each of those segments, one respective electron beam is provided, and in those respective segments a plural number of lines are displayed by means of deflecting those respective electron beams in the vertical direction, and each segment is further divided into a plural number of subsegments in the horizontal direction, and to each subsegment either one of the primary color phosphors of red (R), green (G) and blue (B) is allotted and they are made emit their colors successively by projecting the electron beam thereon, then by controlling the intensity or amount of projected electron beam on those phosphors of R, G and B in responding to the color video signals, as a whole, color television pictures are displayed. Such conventional system has a problem of poor horizontal resolution of displayed picture.

SUMMARY OF THE INVENTION

For image display apparatuses of such kinds as described above, the preset invention is intended to provide an apparatus capable of saving energy to heat line cathodes each of which is for emitting a horizontal row of beams of thermal electrons, and for generating the electron beams with a good distribution uniformity.

In order to attain the above-mentioned object, the image display apparatus in accordance with the present invention comprises a phosphor screen, an electron beam source having a first predetermined number (e.g. 15) of line cathode for in turn emitting the first predetermined number of horizontal rows of electron beams, each row having a second predetermined (e.g. 320) of rod shaped electron beams, horizontal deflection means for horizontal deflections of the electron beams, vertical deflection means for vertical deflections of the electron beams of the horizontal rows and control means for controlling said electron beams, and further comprises as featuring element, switch pair means of the first predetermined number, each switch pair means being for controlling heatings and electron emissions of corresponding one of said line cathodes and comprising each other oppositely working first switching means and second switching means, the first switching means being for switching cathode heating current and the second switching means being for switching cathode bias voltage to bias a selected cathode in turn to enable electron emission, the switch pair means being controlled by switch control signal in turn impressed thereto.

DESCRIPTION OF THE PREFERRED EMBODIMENTS

Figure 1:
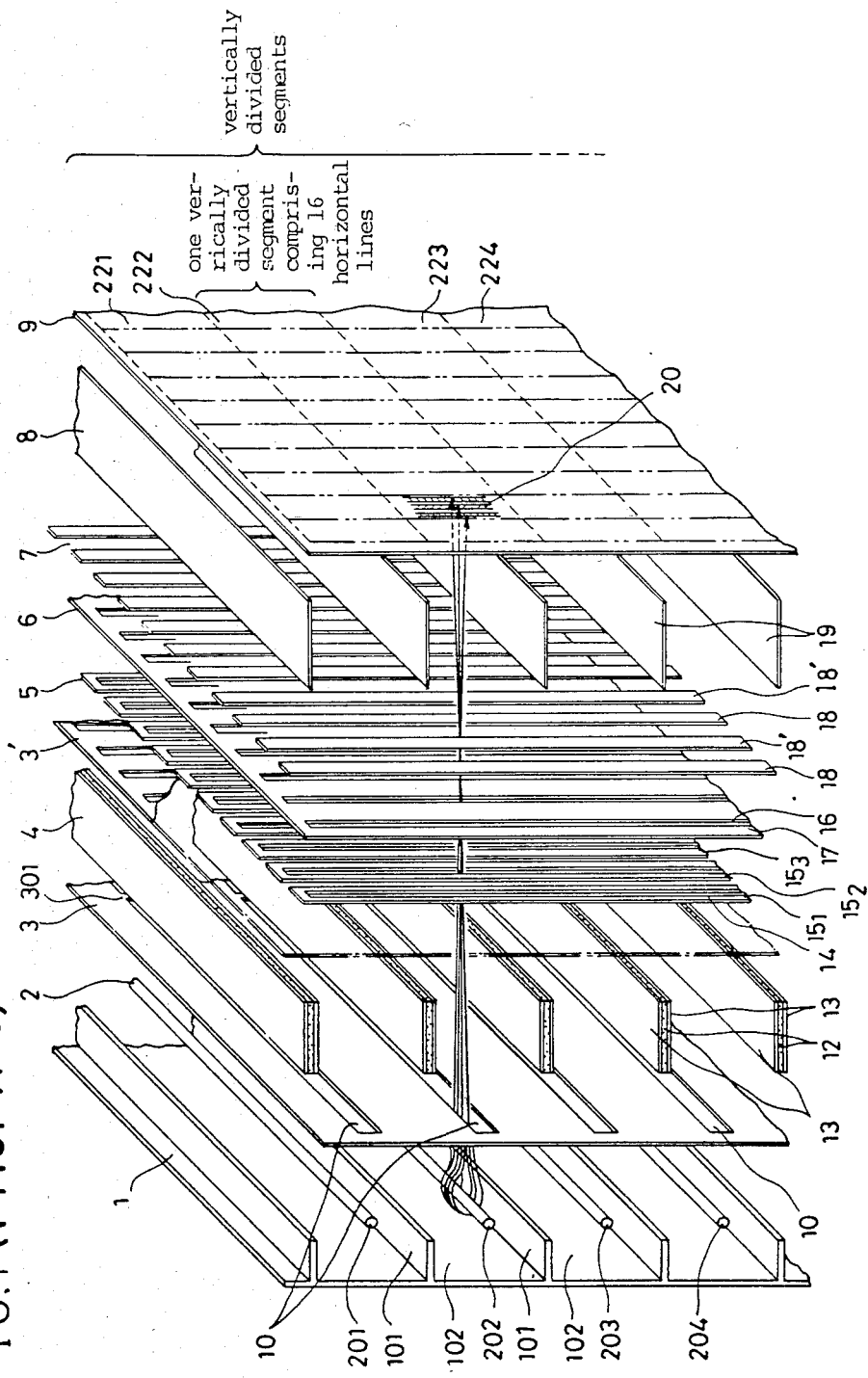
FIG. 1 is an exploded perspective view of a principal part, with its vacuum enclosure removed, of a cathode-ray tube for use in embodying the present invention, expanded of its size in the horizontal direction enlarged in comparison with the vertical direction for easier showing of minute constructions.

An example of the basic configuration of an image display apparatus of the present invention is shown in FIG. 1, wherein from the back part to front part the following components are provided in a flat box-shaped evacuated envelope not shown here, but preferably made of glass:

A back electrode 1 having horizontal isolation walls 101, 101, . . . projecting perpendicularly therefrom forming isolated spaces 102, 102, . . . therein, a row of a predetermined number (e.g. 15 in this embodiment) of horizontal line cathode 201, 202, . . .

disposed substantially horizontally in the isolated spaces 102, 102, . . . , a vertical beam-focussing electrode 3 having the predetermined number (e.g. 15 in this embodiment) of horizontal slits 10, a first vertical deflection means 4 comprising the predetermined number of pair of vertical deflection electrodes 13', 13 . . . , held by insulator board 12. Each pair of vertical deflection electrodes comprises an upper electrode 13 and a lower electrode 13' both disposed substantially horizontal and defining a deflection space inbetween disposed before the corresponding horizontal slit 10, a second vertical beam-focussing electrode 3' substantially similar to the horizontal beam-focussing electrode 6, a predetermined large number (e.g. 320 for this embodiment) of beam control electrodes 5 consisting of vertical strip electrode $15_1$, $15_2$ . . . $15_{320}$ each having beam-passing slits 14, 14 . . . disposed with uniform pitch, a horizontal beam-focussing electrode 6 having the predetermined number (e.g. 320 for this embodiment) of vertical slits at positions in front of the slits 14,14, . . . of the beam control electrodes 5, 5 . . . , a horizontal deflection means 7 comprising the predetermined number (e.g. 320 for this example) of vertical strip electrodes 18, 18', 18, 18' . . . defining the predetermined number (e.g. 320 for this example) of vertically oblong deflection gaps inbetween, a beam acceleration means 8 consisting of a set of horizontally disposed electrodes 19, 19 . . . , and finally a phosphor screen 9, which is ordinarily provided on the inner wall of a front face of the enclosure.

The line cathodes 201, 202 . . . form electron beam source 2, wherein horizontal line cathodes are disposed forming a vertical row, with substantially uniform gaps with each other. In this example, as above-mentioned 15 line cathodes 201, 202 . . . 215 are provided, but only four of them are shown. The line cathodes are made by coating a tungsten wire of, for example, 10–20 μm diameter with known electron emitting cathode oxide. In the prior art, all the line cathodes are always heated by feeding current thereto, and selective in-turn taking out of horizontal sheet shaped electron beam from selected one of the line cathode is done by changing a potential of the in-turn selected line cathode to negative with respect to the potential of the focussing electrode 3.

The back electrode 1 serves to suppress emissions of electrons from other line cathodes than the selected one and also expel the electrons from the selected cathode to its front direction. The back electrode 1 may be formed by attaching conductive substance such as conductive paint on the inner wall of the back face of the flat type vacuum enclosure. A flat plane shaped cathode may be used in place of the row of the line electrode 201, 202 . . . .

The first vertical beam-focussing electrode 3 have the slits 10 at the position to face the line cathodes 201, 202 . . . and is impressed with a DC voltage, therefore horizontal sheet shaped electron beam from a selected line cathode is formed. The sheet shaped electron beam is then divided into a large number (e.g. 320 in this example) of narrow electron beams by passing through the second vertical beam-focussing electrode 3', the control electrode 5 and horizontal focussing electrode 6. In FIG. 1, only one such narrow electron beam is shown for simplicity. Each slit 10 may have supporting ribs in midway part of the length, or further may consists of a large number (e.g. 320) of openings with very narrow rib parts 301 inbetween.

The electrodes 13, 13' of the vertical deflection means 4 are disposed at levels of substantially the centers between vertically neighboring two horizontal slits 10, 10 of the vertical focussing electrode 3, and a lower electrode 13 and an upper electrode 13' are held on both faces (upper and lower faces) of an insulating board 12. A changing voltage (a vertical deflection signal) is impressed across the pair of upper electrode and lower electrode of each pair thereby forming changing electric field for vertical deflection. In this example, as has been elucidated, by impressing the 16-step changing voltage across the pair electrodes, each electron beam is deflected in a manner to have 16 levels. And the same matter takes place in each of 15 vertically divided segments 221, 222, 223 . . . 235 on the phosphor screen. Accordingly, the phosphor screen 9 has 240 horizontal lines in total (16 lines × 15 segments = 240 lines).

The beam control electrodes 5 comprising 320 strip electrodes $15_1$, $15_2$ . . . $15_{320}$ together with the horizontal beam-focussing electrode 6 divide the horizontal sheet shaped electron beam into 320 rod shaped electron beams, and each strip electrodes $15_1$, $15_2$ . . . $15_{320}$ of the beam control electrodes 5 control intensities of the rod shaped electron beams responding to the information of the video signal. Therefore, the 320 strip electrodes control information of 320 picture elements on each horizontal line. The 320 beam control electrodes receive 320 control signals respectively and controls the 320 rod beams in such a manner as, at one time for red color irradiation, at one time for green color irradiation and at one time for blue color irradiation, in turn. In order to display color picture on the color phosphor screen with the control signals applied to the beam control electrodes, each picture element comprises three elementary color regions, namely red strip region, green strip region and blue strip region, which are disposed in horizontal direction.

Figure 3:
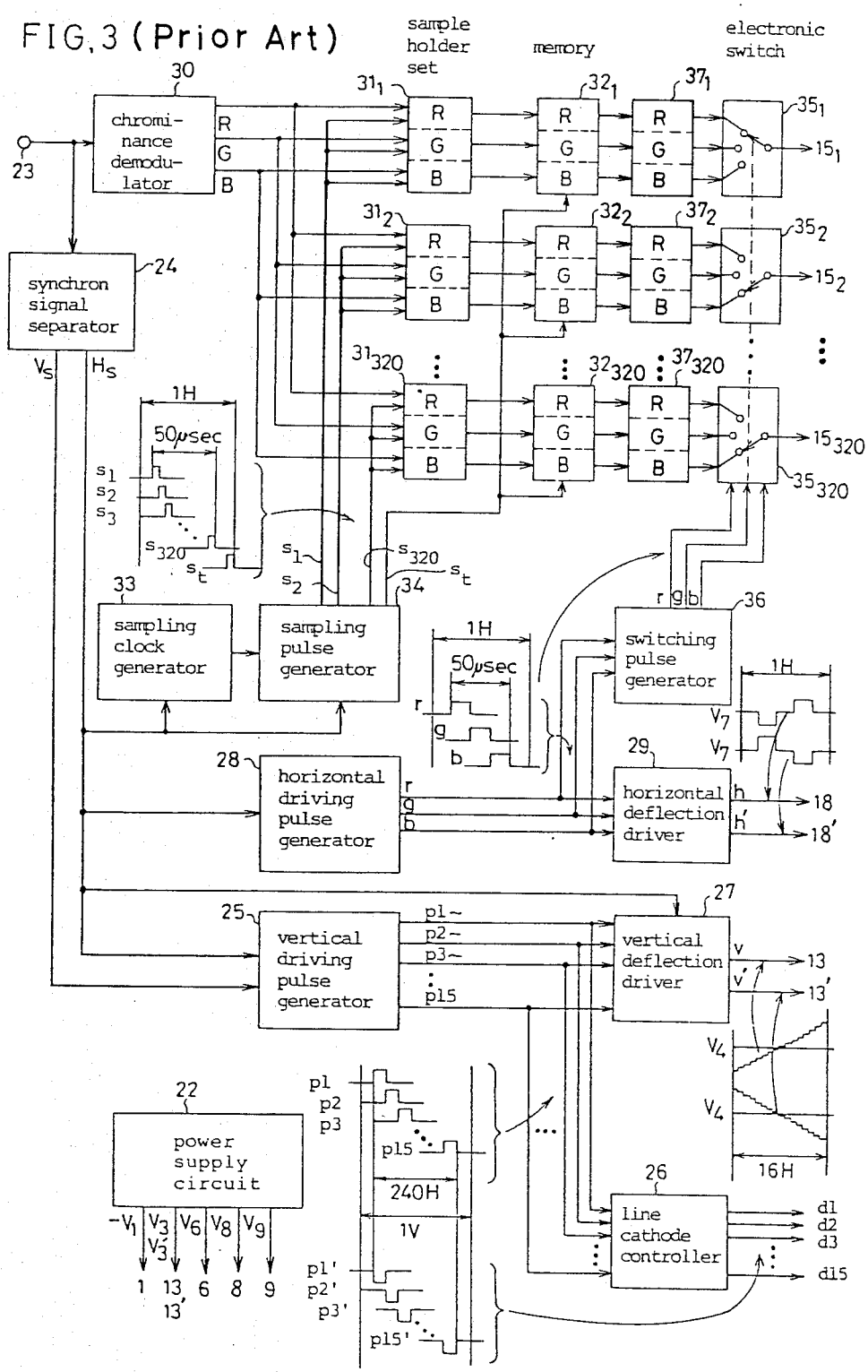
FIG. 3 is a circuit block diagram showing a fundamental electric construction which is for-operating the cathode ray tube of FIG. 1 and is, a not-yet-disclosed inventor's preceding thought prior to the present invention.

In the example shown by FIG. 3, all the 320 beam control electrodes $15_1$, $15_2$ . . . $15_{320}$ receive the beam control signals for displaying respective three primary colors, i.e., red and blue or green, at a same time. That is, at one moment, one horizontal line on the phosphor screen displays an image of red color parts and blue color parts of the line by impingements of red phosphor regions by odd number electron beams and impingements of blue phosphor regions by even number electron beams, at the next moment an image of green color part of the line, and at the next moment an image of red color parts and blue color part of the line by impingements of red color phosphors regions by even number electron beams and impingements of blue color phosphor regions by odd number electron beams. In this apparatus, the odd number electronic switches $35_1$, $35_3$, $35_5$ . . . $35_{15}$ switch to feed signal in the order of R, G and B, and the even number electronic switches $35_2$, $35_4$ . . . $35_{14}$ switch in the order of B, G and R.

The horizontal beam-focussing electrode 6 is a conductor sheet with a plural number, e.g. 320, of slits facing the slits 14 of the control electrodes 5 and is impressed with a DC voltage and focusses the rod shaped electron beams in horizontal direction.

The horizontal deflection means 7 comprises strip electrodes 18, 18' . . . which are disposed at the positions in front of center positions between neighboring slits 16, 16 of the horizontal beam-focussing electrode 6. Each of the strip electrodes pair 18, 18' is impressed with 3-level changing voltage or a horizontal deflection signal, and horizontally deflects rod shaped electron beams, thereby deflecting electron beams of odd number to opposite directions, and making the rod shaped electron beams selectively impinge red phosphor regions, green phospor regions or blue phosphor regions in turn. In another example where a pair of strip electrodes are provided for each slit and whole pair are impressed with same direction voltage, both even number electron beams and odd number electron beams in the same direction.

In the example, where a horizontal row of 320 rod shaped electron beams impinge 320 sets of three primary color regions, one horizontal deflection range corresponds to one horizontal picture element width.

The horizontally disposed electrodes of the beam-acceleration means 8 are disposed at the height level corresponding to those of the composite body of vertical deflection electrodes 13 and 13' and are impressed with a DC voltage.

The phosphor screen 9 may be provided with known metal back layer (not shown) formed on the side of cathodes and a positive DC voltage is impressed thereon. In practical example, the phosphor regions are formed vertically oblong strips of red color phosphor, green color phosphor and blue color phosphor. In FIG. 1, horizontal broken lines on the phosphor screen 9 show boundary lines between neighboring vertically divided segments to be impinged by electron beams of respective line cathodes. Vertical chain lines on the phosphor screen 9 shown boundary lines between horizontally neighboring sets of three primary color phosphor strips.

Figure 2:
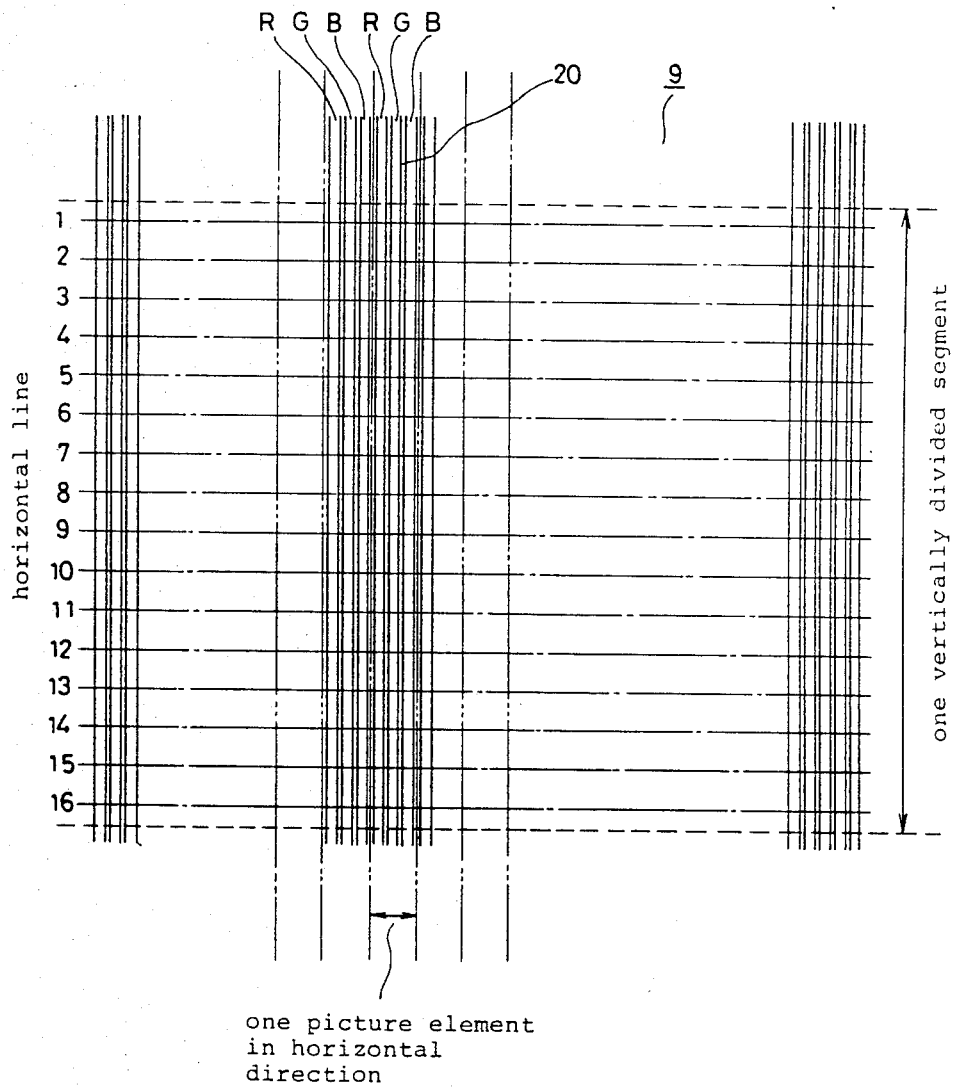
FIG. 2 is a schematic expanded front view of a part of a phosphor screen of the cathode ray tube of FIG. 1.

A small segment 20, which is defined by two neighboring vertical chain lines and two neighboring horizontal broken lines, is shown enlarged in schematic view of FIG. 2, wherein the small segment 20 has 16 horizontal lines in vertical row. In an actual example, one segment has the size of 16 mm high in vertical direction and 1 mm width in horizontal direction, and in FIG. 1 the sizes are shown enlarged in widthwise direction as has been mentioned.

Apart from the above-mentioned example where 320 sets of three primary color phosphor regions are formed widthwise of the phosphor screen for 320 rod shaped electron beams produced by 320 slits 14 of the beam-control electrode 5 and 320 slits 16 of the horizontal beam-focussing electrode 6, such a modification may be made that for the 320 sets of three primary color phosphor regions, 160 rod-shaped electron beams are provided, and in this case the horizontal deflection signal is 6-level changing voltage which deflects the rod-shaped electron beam to sweep for the horizontal range of the color phosphor regions of RGBRGB, and each of the beam-control electrodes 5 also receives the control signal for two picture elements in sequence.

FIG. 3 shows a circuit block diagram of a fundamental electric construction of the apparatus of FIG. 1. The explanation starts from the part to drive the cathode ray tube to form a raster on its phosphor screen.

A power supply 22 is for impressing necessary voltages on various electrodes of the flat cathode ray tube of FIG. 1. The following DC voltages are supplied to the electrodes:

$-V_1$ to back electrode 1,
$V_3$ to vertical beam-focussing electrode 3,
$V_3'$ to vertical beam-focussing electrode 3',
$V_6$ to horizontal beam-focussing electrode 6,
$V_8$ to acceleration electrode 8,
$V_9$ to phosphor screen 9.

An input terminal 23 receives ordinary composite video signal and give it to a synchronizing signal separator 24 and to a chrominance demodulator 30. The synchronizing signal separator 24 separate and issues vertical synchronizing signal $V_s$ and horizontal synchronizing signal $H_s$. A vertical driving pulse generator 25 comprises a counter which count the horizontal synchronizing signal $H_s$ and is reset by the vertical synchronizing signal $V_s$, and issues 15 driving pulses p1, p2, p3 ... p15, each having duty time of 16H (1H is the time period for one horizontal scanning). The fifteen pulses p1 to p15 are issued during an effective vertical sweep period, which is the time length of one vertical sweep period exclusive of vertical fly-back time and is of 240H time length. The driving pulses are then given to the line cathode controller 26, where they are inversed of polarity to produce pulses p1', p2', p3' ... p15' falling down to OV at respective inversed peak period (of 16H length) and retaining 20 V for other period, and is fed to respective line cathodes 201, 202, 203 ... 215. The line cathodes are always heated by a small voltage DC current so as to be able to emit electrons at any time, and the electrons are taken out, when the pulse of a selected line cathode is at its peak (OV), by means of positive electric field towards the vertical beam-focussing electrode 3 and subsequent other electrodes. For period other than the peak (OV) of the pulses impressed on a line cathode, because of negative electric field formed by impression of +20 V thereon, the line cathodes do not emit electron beam. That is, one of the 15 line cathodes in turn emit electrons beams. Therefore, the line cathodes are activated in turn from the top one 201 to the bottom one 215 each for 16H time period. The emitted electrons are driven forward to the vertical beam-focussing electrodes 3, 3' and focussed to form a horizontal sheet-shaped electron beam.

A vertical deflection driver 27 comprises a counter for counting horizontal synchronizing signal $H_s$ and is reset by the output pulses p1, p2 ... p15 of the vertical driving pulse generator 25 and an A/D converter for A/D converting the count output. And the vertical deflection driver 27 issues a pair of vertical deflection signals v, v', which are 16-step rising sawtooth wave and 16-step falling sawtooth wave, respectively, both having center voltage of $V_4$. These vertical deflection signals v and v' are impressed on the upper vertical deflection electrodes 13 and the lower vertical deflection electrodes, respectively. Accordingly, the sheet shaped electron beams are vertically stepwisely deflected in 16 steps and repeat the same. And therefore, a horizontal line displayed on the phosphor screen stepwisely falls from top position to bottom position in 16 steps in one vertically divided segment 221, 222 ... or 235 of FIG. 1.

Since the activation of the line cathodes is stepwisely shifted one by one downward every 16H time period, when the horizontal line on the phosphor screen comes down and arrives at the bottom of the first vertically divided segment 221, the next moving of the horizontal line on the phosphor screen starts from the top position of the second vertically divided segment 222, and the similar downward shifting of the horizontal line proceeds until the horizontal line arrives at the bottom of the 15th (lowest) vertically divided segment 235, and the horizontal line goes back to the top of the first segment 221. That is, the vertical deflection of the horizontal line continuously proceeds from the top (No. 1 horizontal line) to the bottom (No. 240, i.e., (15×16)th) of the phosphor screen 9, thereby forming a raster of 240 horizontal lines.

The sheet-shaped electron beam is then divided into 320 rod-shaped electron beams having substantially round sections when passing through the vertically oblong slits 14, 14 . . . of the beam-control electrode $15_1$, $15_2$ . . . and vertically oblong slits 16, 16 . . . of the horizontal beam-focussing electrode 6. The rod-shaped electron beams are controlled of their currents by means of voltage impressed on respective strip electrodes of the beam-control means 5, and further deflected by horizontal deflection means 7 so as to have one of three positions corresponding to R, G and B regions of the phosphor screen 9 by means of the horizontal deflection signals given by the horizontal deflection driver 29.

A horizontal driving pulse generator 28 comprises three stages of sequentially connected monostable multivibrators, the first stages of which is triggered by horizontal synchronizing signal $H_s$. And the horizontal driving pulse generator issues three pulses r, g and b of the same pulse widths. For one example, an effective horizontal scanning period of 50μ sec. is divided into 3 periods for the pulses r, g and b, accordingly, the pulses, r, g and b have 16.7μ sec. pulse width each. The horizontal driving pulses r, g and b are given to the horizontal deflection driver 29, which is switched by the horizontal driving pulses r, g and b and issues a pair of horizontal deflection signals h and h'. These horizontal deflection signals h and h' are three step rising signal and three step falling signal, respectively, and, both have the same center voltage $V_7$. These horizontal deflection signals h and h' are given to the horizontal deflection electrodes 18, 18, 18 . . . and 18', 18', 18' . . . dispose alternately in the horizontal deflection means 7. As a result, 320 rod-shaped electron beams are deflected at the same time to R, G or B regions on a same horizontal line of the phosphor screen.

It should be noted that in the construction shown in and elucidate referring to FIG. 1, the number of strip electrodes 18, 18' . . . of the horizontal electrodes are 320 for the 320 rod-shaped electron beams, and the strip electrodes 18, 18' . . . are alternately connected to the output terminals h and h' of the horizontal deflection driver. Accordingly, the electric fields of horizontal deflection gaps defined by neighboring two strip electrodes 18 and 18' are not of the same direction. Namely, the directions of electric field of the horizontal deflection gaps are alternatingly opposite each other for neighboring horizontal deflection gaps. The effect of this alternatingly opposite electric field is compensated as will be elucidated later.

Thus, the horizontal line on the phosphor screen at one time displays red image at the same time, at the next time green image at the same time and at the next time blue image at the same time, and at the next time the line proceed to the next lower line whereon the same is repeated.

The beam intensity control is made as follows:

The input composite video signal received at the input terminal 23 is given to the chrominance demodulator 30 where color differential signals R-Y and B-Y are demodulated and G-Y is also produced by known matrix circuit therein, and by processing these color differential signals with a luminance signal Y, primary color signals R, G and B are produced. The primary color signals R, G and B are given to 320 sets of sample-hold means $31_1$, $31_2$ . . . $31_{320}$, each comprising three elementary sample-hold circuits for R, G and B color signals. Though the color differential signals R-Y and B-Y have a low frequency components only, the processed primary color signals R, G and B has high frequency components. The output signals of the 960 elementary sample-hold circuits are given to 320 sets of memory means $32_1$, $32_2$ . . . $32_{320}$, each comprising three memories for R, G and B color signals.

On the other hand a sampling clock generator 33 comprises PLL (phase locked loop) circuit, and issues sampling clock pulses of 6.4 MHz, which is controlled to have a predetermined phase difference against the horizontal synchronizing signal $H_s$. The sampling clock pulses are given to the sampling pulse generator 34, wherein by means of, for example, a shift register of 320 stages, 320 sampling pulses $S_1$, $S_2$ . . . $S_{320}$, each having phase difference by 50 μsec/320 time inbetween, are produced and given to the sample hold circuits $31_1$, $31_2$ . . . $31_{320}$, respectively. After the last sampling pulse $S_{320}$, a transferring pulse $S_t$ is issued from the sampling pulse generator 34 to the memories $32_1$, $32_2$ . . . $32_{320}$. The sampling pulses $S_1$, $S_2$ . . . $S_{320}$ correspond to 320 picture elements in the horizontal direction on the phosphor screen 9, and their timings are controlled so as to have a constant relation with respect to the horizontal synchronizing signal $H_s$. By impressing the 320 sets of sampling pulses to respective 320 sets of sample-hold circuits, the sample-hold circuits $31_1$, $31_2$ . . . $31_{320}$ sample and hold R, G and B information of video signals therein. After finishing of the sample-hole for one horizontal line, upon receipt of the transfer signal $S_t$ by the memories, the sample-held informations are transferred at one time to the memories $32_1$, $32_2$ . . . $32_{320}$, and retained there for the next one horizontal scanning period (H=63.5 μsec).

The R, G and B information of the video signal for the one horizontal line stored in the memories $32_1$, $32_2$ . . . $32_{320}$ are led to pulse width modulation circuits $37_1$, $37_2$ . . . $37_{320}$, outputs of which are led to 320 electronic switches $35_1$, $35_2$ . . . $35_{320}$, which are electronics switches comprising analog gate circuits for selectively leading the stored signals of a color R, G or B to the respective strip electrodes $15_1$, $15_2$ . . . $15_{320}$ of the beam control means 5. The pulse width modulation circuits $37_1$, $37_2$ . . . $37_{320}$ make pulse width modulation on fundamental pulse train signal responding to amplitudes of the video signals applied thereto. Periods of the fundamental pulse train signals should be sufficiently shorter, for example from 1/100 to 1.10, than those of the horizontal driving pulses r, g and b (each 16.7 μsec). The switching circuits $35_1$, $35_2$ . . . $35_{320}$ are simultaneously switched, being controlled by switching pulses given from a switching pulse generator 36, which is controlled by the output pulses r, g and b of the horizontal driving pulse generator 28. The electronic switches $35_1$, $35_2$ . . . $35_{320}$ switch every 16.7 μsec (=50 μsec/3) for selectively leading the video signal information of R, G and B color in turn each for 16.7 μsec.

In the switching, the switching circuits of the odd number orders are switched in the order of R→G→B while the switching circuits of the even number orders are switched in the order of B→G→R, so that the effect of the alternatingly opposite directed electric fields produced by the horizontal deflection means 7 is compensated.

Hereupon it should be noted that timing (phases) of the switchings of the electronic switches $35_1$, $35_2$ ... $35_{320}$ and the horizontal deflection driver 29 should be completely synchronized with each other, in order to avoide poor color impurity caused by undesirable mixing of a color signal with other color signals.

As a result of the operation as has been elucidated, the phosphor screen displays red color image of one horizontal line at one time, followed by green color image of the horizontal line at one time and further followed by blue color image of the horizontal line at one time, and then the same displaying is made proceeding to the next (lower) line, and thus displaying of one field having 240 horizontal lines is completed. And the displayings of the fields are repeated and television picture is obtainable on the phosphor screen 9.

In case the number of picture elements on one horizontal line is selected twice or three times of the number of rod shape electron-beams each individually controlled by independent beam control electrodes $15_1$, $15_2$, ..., the number of the above-mentioned sample-hold circuits must be increased twice or three times, to the number of the picture elements on the line, and relevantly, the numbers of the memories should also be increased to the same number. And each electronic switch should selectively connect the outputs of the increased number of memories time sharingly to the corresponding beam-control electrodes.

The primary colors of the phosphor regions are not necessarily limited to the combination of the R, G and B, but any other combinations as the primary color of phosphors may be usable.

In the above-mentioned description, the words "horizontal" and "vertical" are used to imply that "horizontal" is the direction that the lines are displayed on the phosphor screen, and "vertical" is the direction that the displayed line is shifted to the next line to form a raster, and accordingly these words are not bound to the absolute spatial relation of the screen.

As has been elucidated in the above-mentioned image display apparatus, it is necessary to control the electron beam source means in a manner that electron beams are in turn taken out only for necessary time periods while in other period they should not come out; and in order to make such operation, the line cathodes should be controlled in good synchronization with the scannings.

Figure 4:
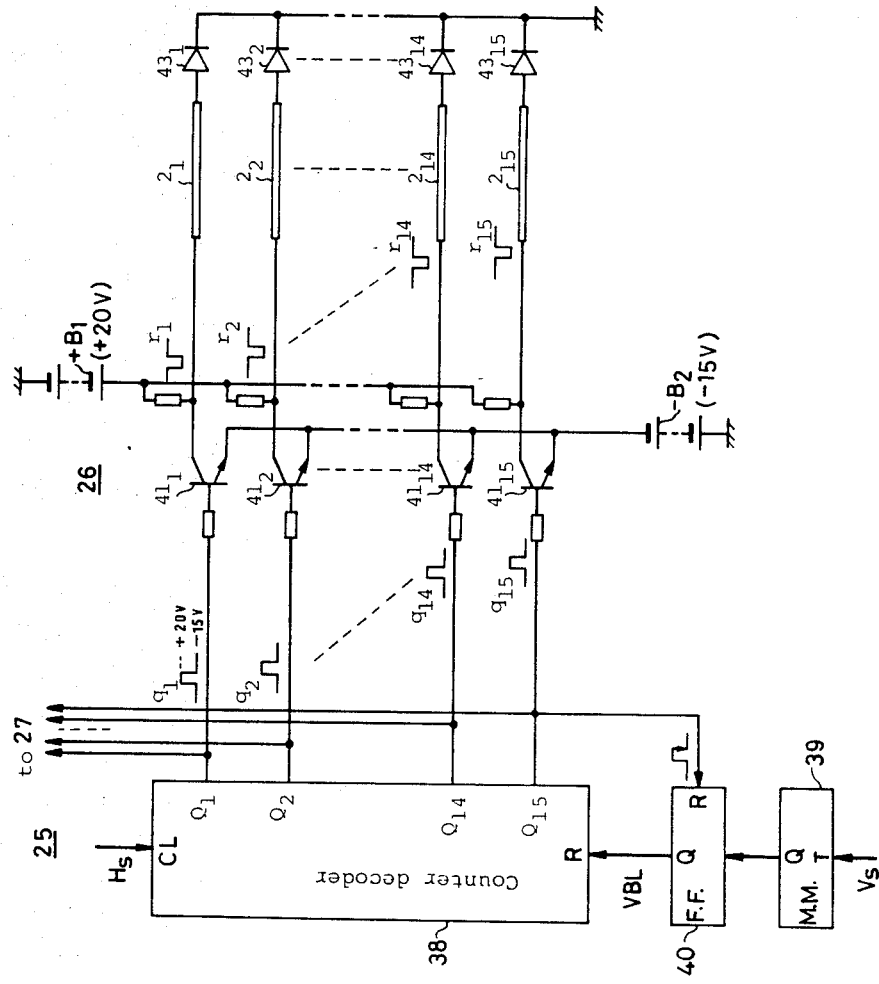
FIG. 4 and FIG. 5 are circuit diagrams of a not-yet-disclosed inventor's preceding thought prior to the present invention of vertical deflection circuit part in the circuit of FIG. 3.
Figure 5:
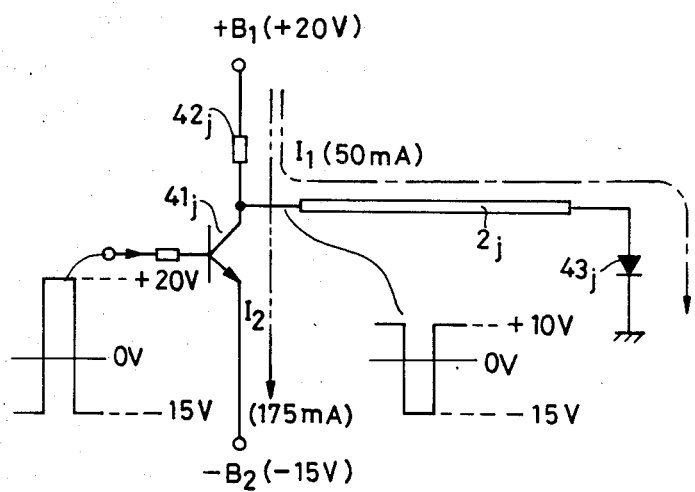

FIG. 4 shows one example of inventor's not-yet-disclosed preceding thought of vertical driving pulse generator 25 and line cathode controller 26, and FIG. 5 elucidates operation of a line cathode.

The vertical driving pulse generator 25 comprises a counter decoder 38 for issuing 15 pulses $q_1$, $q_2$, $q_3$ ... $q_{15}$ of 16H width (i.e., having time period for 16 horizontal scannings) from its 15 output terminals $Q_1$, $Q_2$ ... $Q_{15}$. The timing of the counter decoder 38 is controlled by a monostable multivibrator 39 which is triggered by vertical synchronizing signal from a synchronization signal separator and has a pulse which falls down immediately before starting of an effective vertical scanning, the fall-down edge sets a flipflop circuit 40 and makes a vertical blanking pulse VBL from the flipflop circuit 40 fall down. The vertical blanking pulses VBL is given to the counter decoder 38 as reset signal, and the counter decoder 38 makes count decode operation only when the vertical blanking pulse VBL is at high level. By controlling with such vertical blanking pulse VBL, the counter decoder 38 can be started its operation from starting time point of the effective vertical scanning. Then, the last output pulse $q_{15}$ of the counter decoder 38 is given to the flip-flop circuit 40 to reset the flipflop circuit 40 to the level of the vertical blanking pulse VBL fall down to low level at the time point of rear edge of the pulse $q_{15}$, and thereafter counter decoder ceases to output pulses until next rise up of the vertical blanking pulse VBL.

The driving pulses $q_1$ to $q_{15}$ are in turn impressed on the bases of transistors $41_1$, $41_2$ ... $41_{15}$ of the line cathode controller 26, so as to make selected one of the transistors conductive during impressing of the pulse signal $q_1$, $q_2$ ... $q_{15}$. The collectors of the transistors $41_1$, $41_2$ ... are connected to the positive terminal of a power source or a positive power source $+B1$ through resistors $42_1$, $42_2$ ... $42_{15}$, respectively; and emitters of the transistors $41_1$, $41_2$ ... $41_{15}$ are connected to the negative terminal of a power source or a negative power source $-B2$. Therefore, at the collectors of the transistors $41_1$, $41_2$ ... $41_{15}$, such line cathode driving pulse signals $r_1$, $r_2$ ... $r_{15}$ appear that the pulses signals become $-B2$ at the periods $t_1$, $t_2$ ... $t_{15}$ and rest of time period are 20 volts high. These line cathode driving pulse signals are impressed on ends of the line cathodes $2_1$, $2_2$ ... $2_{15}$, and the other ends of the line cathodes being grounded through diodes $43_1$, $43_2$ ... $43_{15}$, respectively. As a result of such configuration, the line cathodes $2_1$, $2_2$ ... $2_{15}$ are heated by a current $I_1$ shown in FIG. 5 which flows through the resistor $42j$, line cathode $2j$, diode $43j$ and to the ground based on the driving pulse signals $r_1$, $r_2$ ... $r_{15}$, to such temperature to be able to emit electrons. However, during the high voltage periods of each line cathodes, since the potential of the line cathodes $2_1$, $2_2$ ... $2_{15}$ are higher than those of back electrode 1, the electrons are not emitted. Then, when one of selected line cathode driving pulse signals $r_1$, $r_2$ ... $r_{15}$ in turn becomes to low voltage during a pulse period, the corresponding one diode of $43_1$, $43_2$ ... or $43_{15}$ becomes cut off, and potential of the selected line cathode becomes low, thereby enabling emission of electrons. Though, the heating current is stopped during this very short pulse period, the heater can emit electrons since the heater can retain its high temperature for the very short time.

Thus the line cathodes $2_1$, $2_2$ ... $2_{15}$ are activated in turn to emit electrons, each for 16H periods. Thus vertical scanning is made sequentially relaying from top line cathode $2_1$ to bottom line cathode $2_{15}$ during the effective vertical scanning period.

Instead of using the counter decoder 38, the vertical driving pulses $q_1$, $q_2$ ... $q_{15}$ can be made by a circuit of 15 cascade-connected monostable multivibrators, each generating pulse of 16H width pulse, the initial stage of the monostable multivibrator cascade connection being connected to be triggered by the vertical blanking pulse VBL of the flipflop 40 at the starting time of each effective vertical scanning period.

Instead of the above-mentioned example using the vertical blanking pulses VBL, such other examples can be made that uses vertical synchronous signal as such, or a signal made by integrating the vertical synchronous signal followed by wave-shaping, or etc.

In the above-mentioned inventor's prior art of FIG. 4, the problem is that the resistors $42_1$, $42_2$ ... $42_{15}$ consume considerable waste powers since current flows from the first power source $+B1$ through the resistor $42j$ and the transistor $41j$ to the negative power source $-B2$ (hereinafter a suffix "j" is used to represent any of suffix between 1 and 15.). And that, the transistors $41_1$, $41_2 \ldots 41_{15}$ must be of large current type, since the line cathode current is so large as about 50 mA in order to be heated to emit electrons. When a current I of 50 mA passes the resistor $42j$ of resistance R, a power loss of $R \times I^2$ produced. By reducing the resistance of each resistor $42_1$ to $42_{15}$ smaller, the power loss can be made smaller, but on the other hand a current which flows when the transistor $41j$ is conductive becomes larger thereby making power loss in the resistors $42_1$ to $42_{15}$, and at the same time, collector currents of the transistors $41_1$ to $41_{15}$ are considerable. Provided that in an example, resistances R of the resistors $42_1, 42_2 \ldots 42_{15}$ are 200Ω, resistances of the cathodes $2_1, 2_2 \ldots 2_{15}$ are 200, then necessary positive source voltage of $+B1$ is 20 V $(=200\Omega+200\Omega) \times 0.05A$. When the voltage of the negative source voltage $-B1$ is $-15$ V, the current through a selected transistor $41j=0.175A$. Therefore, the power loss due to the current through the resistor $42j$ is large, and moreover, as the transistors $41_1$ to $41_{15}$ a considerably large current type, hence expensive transistors are necessary.

Figure 6:
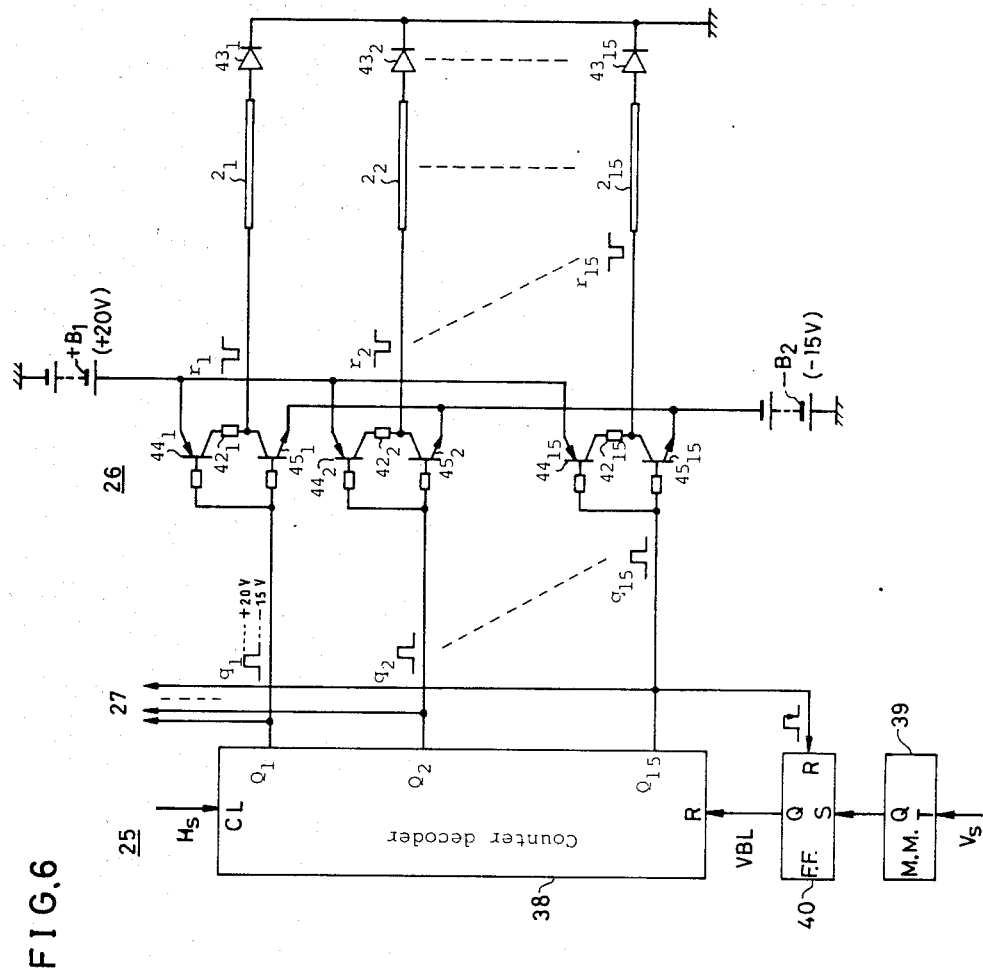
FIG. 6 and FIG. 7 are circuit diagrams of a vertical deflection circuit part in the circuit of FIG. 3 embodying the present invention.
Figure 7:
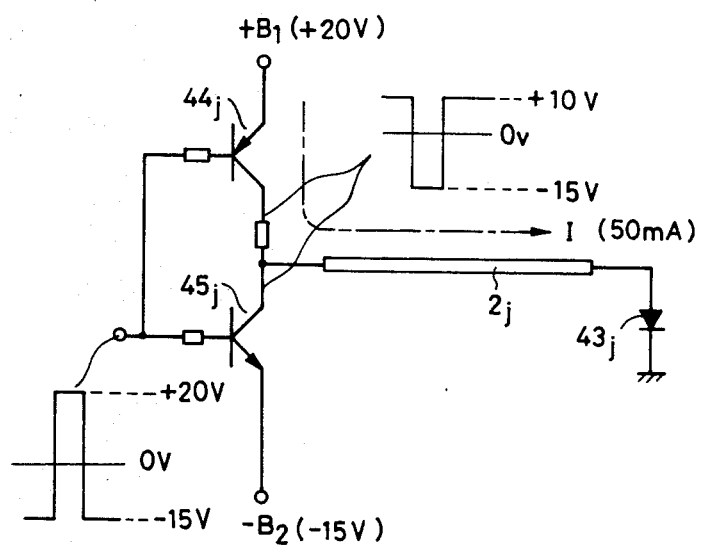

An example in accordance with the present invention is shown by FIG. 6 and FIG. 7, wherein the parts corresponding to those of FIG. 4 and FIG. 5 are shown by the same numerals. FIG. 7 is a circuit for one line cathode for elucidation of the operation of the circuit of FIG. 6.

The circuit of FIG. 6 and FIG. 7 comprises pure complementary switching circuits, namely circuits of push-pull connection, each of which comprises a PNP transistor $44j$ and an NPN transistor $45j$, the collectors of the PNP transistors $44j$ and the NPN transistor $45j$ are connected to each other through a resistor $42j$, the emitter of the PNP transistor $44j$ is connected to a positive power source $+B1$, the emitter of the NPN transistor $45j$ is connected to a negative power source $-B2$, the collector of the NPN transistor $45j$ is connected to one end of a line cathode $2j$, the other end of which is grounded through a diode $43j$. The other ends of the positive power source $+B1$ and the negative power source $-B1$ are also grounded. The bases of the PNP transistor $44j$ and the NPN transistor $45j$ are connected through respective resistors in common and to the output terminal $q_j$ of the counter decoder 38. The above-mentioned same connections are repeated for the circuits of 15 PNP transistors $44_1, 44_2 \ldots 44_{15}$ and 15 NPN transistors $45_1, 45_2 \ldots 45_{15}$.

Operation of the circuit of the first example shown in FIG. 6 is as follows:

By impressing of vertical driving pulses $q_j$ in turn on a bases, during low level period (that is a heating period for the line cathode $2j$) of the pulse $q_j$, the NPN transistor $45j$ is cut off and the PNP transistor $44j$ is conductive, thereby heating current I is lead as shown in FIG. 7, through the PNP transistor $44j$ and the resistor $42j$ to the line cathode $2j$ and through the diode $43j$ to the ground point. On the contrary, during high level period (that is an electron emission period for the line cathode $2j$) of the pulse qj, the NPN transistor $45j$ is conductive and the PNP transistor $44j$ is cut off, thereby the junction point between collector of the transistor $45j$ and the line cathode $2j$ is held at the negative potential by the second (negative) power source $-B2$, thereby making the diode $43j$ cut off. Therefore, heating current is cut off during the short period of the pulse $r_j$, and at the same time the line cathode $2j$ emits electrons since the line cathode $2j$ is held at a low potential with respect to the back electrode 1. In the circuit of FIG. 6, the transistor $44j$ is cut off in the electron emitting period, and therefore there is no wasteful flowing of current from the positive power source $+B1$ to the negative power source $-B2$ through. Therefore, the current through the transistor $45j$ at the time of this electron emitting period is very small one which is the current of the electron emission. Therefore the NPN transistors $45_1$ to $45_{15}$ can be of small current type, and there are no substantial current loss, hence no power loss in these transistors $45_1$ to $45_{15}$ and $44_1$ to $44_{15}$. Since there is no cathode heating current in this electron emitting period, there is no substantial potential gradation on the cathode, and therefore electron emission becomes uniform. Of course, during the cathode heating period, the current flowing in the PNP transistor $44j$ is the line cathode current only, which is about 50 mA per one line cathode $2j$, and therefore, the PNP transistor $44j$ can be of a moderate size. Furthermore, since the transistor $44j$ operates in its saturation region, the power consumption therein is small. The heating current of the line cathode $2j$ is determined by resistances of the resistor $42j$ and the line cathode $2j$ and the voltage of the positive power source $+B1$, and therefore, by suitably selecting the resistances of the line cathode the resistor $42j$ can be omitted. Since the current in the resistor $42j$ flows only during the cathode heating period, the resistance can be determined solely for the cathode heating current, and power loss in the resistor $42j$ can be also very small.

Figure 8:
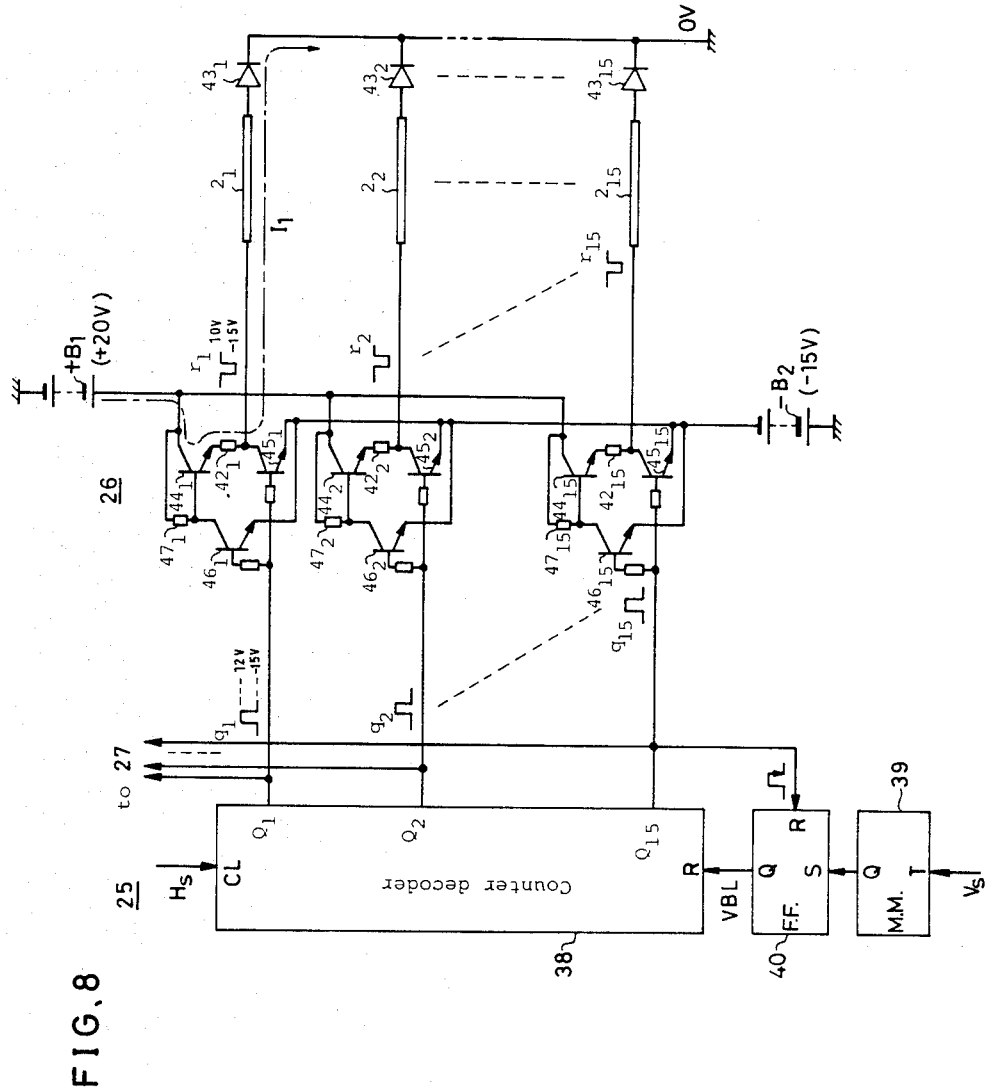
FIG. 8 is a circuit diagram of a second example of the present invention.

FIG. 8 shows a second example. Parts corresponding to those of the foregoing example of FIG. 6 is shown by the same numerals. The circuit of FIG. 8 has 15 sets of circuit each comprising three switching transistors of the same conductivity type, one line cathode and one series connected diode. In each set, a first NPN transistor $44j$ and a second NPN transistor $45j$ are connected to form a push-pull circuit. The first NPN transistor $44j$ is connected by the collector to a positive power source $+B1$ by the emitter to the collector of the second NPN transistor $45j$ and by the base to the collector of a third NPN transistor $46j$. The second NPN transistor $45j$ is connected by the emitter to a negative power source $-B2$ and by the base through a resistor to an output terminal Qj of the counter decoder 38. The third NPN transistor $46j$ is further connected by the base through a resister to the output terminal Qj and by the emitter to the negative power source $-B2$. A resistor $47j$ is connected between the base and the collector of the first NPN transistor $44j$. One end of the line cathode $2j$ is connected to the collector of the second NPN transistor $45j$ and the other end is grounded through a diode $43j$. The other ends of the positive power source $+B1$ and the negative power source $-B1$ are also grounded. The above-mentioned same connections are repeated for 15 sets of the circuits of switching means pair.

The bases of the transistors $45j$ and $46j$ in turn receive vertical driving pulses $q_j$. During low level period (that is a heating period for the line cathode $2j$) of the pulse qj, the transistors $45j$ and $46j$ are cut off, and the first transistor $44j$ is conductive. Accordingly, a heating current Ij is lead, as shown by a chain line for $I_j$, through the first transistor $44j$ and the resistor $42j$ to the line cathode $2j$ and through the diode $43j$ to the ground point. On the contrary, during high level period (that is an electron emission period for the line cathode $2j$) of the pulse $q_j$, the second transistor $45j$ is conductive and the first transistor $44j$ is cut off, thereby the junction point between the collector of the transistor $45j$ and the line cathode $2j$ is held at the negative potential by the second (negative) power source −B2, thereby making the diode 43j cut off. Therefore, heating current is cut off during the short period of the pulse $r_j$, and at the same time the line cathode 2j emit electrons since the line cathode 2j is held at a low potential with respect to the back electrode 1. In the circuit of FIG. 8, the transistor 44j is cut off in the electron emitting period, and therefore there is no wasteful flowing of current from the positive power source +B1 to the negative power source −B2 through. Therefore, the current through the second transistor 45j at the time of this electron emitting period is very small one which is the current of the electron emission. Therefore the transistors $45_1$ to $45_{15}$ can be of small current type, and there are no substantial current loss, hence no power loss, in these transistors $45_1$ to $45_{15}$ and $44_1$ to $44_{15}$. Since there is no cathode heating current in this electron emitting period, there is no substantial potential gradation on the cathode, and therefore electron emission becomes uniform. Of course during the cathode heating period, the current flowing in the first transistor 44j is the line cathode current only, which is about 50 mA per one line cathode 2j, and therefore, the first transistor 44j of a moderate size. Furthermore, since the first transistor 44j operates in its saturation region, the power consumption therein is small. The heating current of the line cathode 2j is determined by resistances of the resistor 42j and the line cathode 2j and the voltage of the positive power source +B1, and therefore, by suitably selecting the resistances of the line cathode the resistor 42j can be omitted. Since the current in the resistor 42j flows only during the cathode heating period, the resistance can be determined solely for the cathode heating current, and power loss in the resistor 42j can be also very small. The transistors 44j, 45j and 46j may be all PNP conductivity type. Besides, other equivalent switching element or composite switching circuit may be used instead of the same type transistors.

Figure 9:
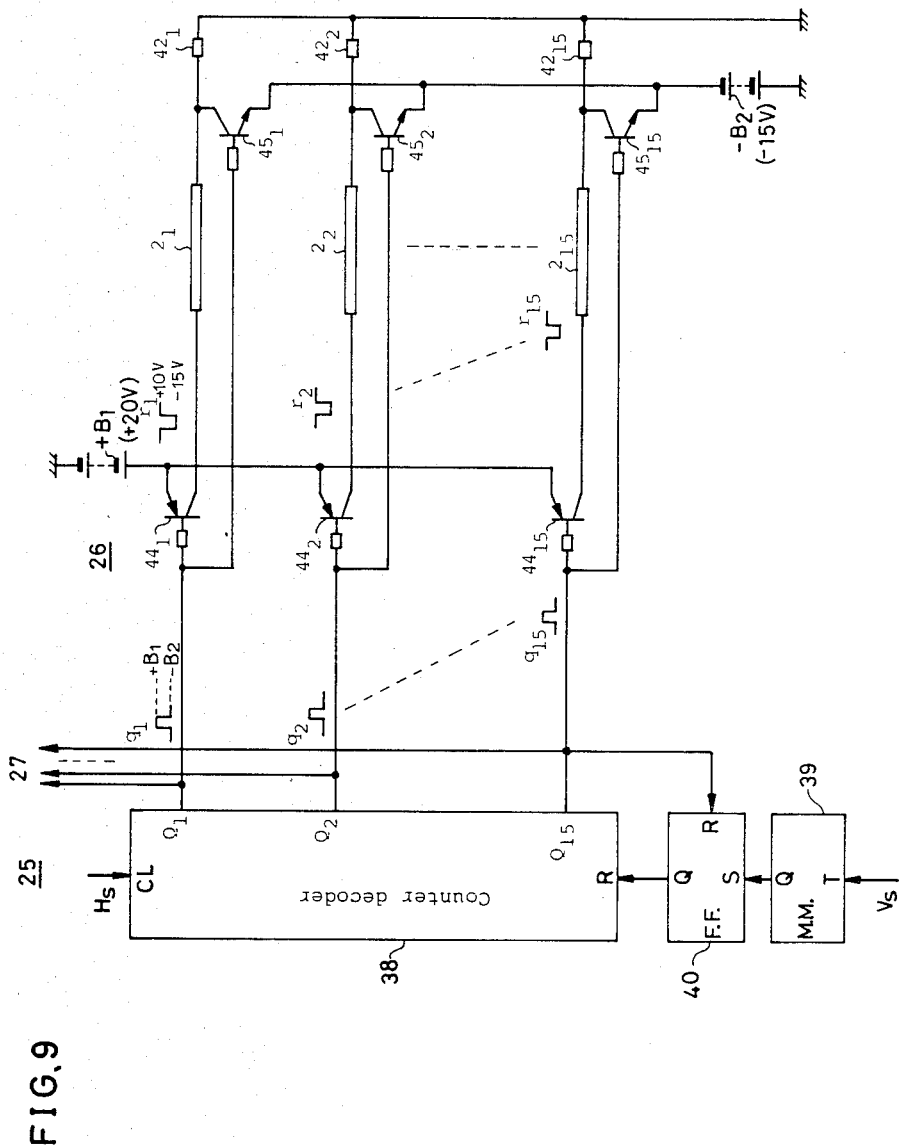
FIG. 9 is a circuit diagram of a third example of the present invention.

A third example embodying the present invention is shown in FIG. 9 wherein parts corresponding to those of the foregoing examples of FIG. 6 and FIG. 8 are shown by the same numerals. The circuit of FIG. 9 has 15 sets of circuit, each comprising two switching transistors, namely, a first transistor 44j of PNP type and a second transistor 45j of NPN type. The first transistor 44j is connected by the collector to one end of a line cathode 2j by the emitter to a positive power source +B1 and by the base through a resistor to an output terminal Qj of the counter decoder 38. The second transistor 45j is connected by the collector to the other end of the line cathode 2j which end is grounded through a resistor 42j, by the emitter to a negative power source −B2 and by the base through a resistor to the output terminal Qj. The other ends of the positive power source +B1 and the negative power source −B1 are also grounded. The above-mentioned same connections are repeated for 15 sets of the circuits.

The bases of the transistors 44j and 45j receive vertical driving pulses $q_j$ in turn. During low level period (that is a heating period for the line cathode 2j) of the pulse $q_j$, the second transistor 45j is cut off, and the first transistor 44j is conductive. Accordingly, a heating current Ij from the positive power source +B1 is lead through the first transistor 44j to the line cathode 2j and then through the resistor 42j to the ground point. On the contrary, during high level period (that is an electron emission period for the line cathode 2j) of the pulse $g_j$, the second transistor 45j is conductive and the first transistor 44j is cut off, thereby the heating current Ij ceases and the line cathode 2j is held at the negative potential by connection to the second (negative) power source −B2. Therefore, heating current is cut off during the short period of the pulse $r_j$, and at the same time the line cathode 2j emits electrons since the line cathode 2j is held at a low potential with respect to the back electrode 1. In the circuit of FIG. 9, the transistor 44j is cut off in the electron emitting period, and therefore there is no wasteful flowing of current from the positive power source +B1 to the negative power source −B2 through. The current through the second transistor 45j at the time of this electron emitting period is very small one which is the current of the electron emission. Therefore the transistors $45_1$ to $45_{15}$ can be of small current type, and there are no substantial current loss, hence no power loss, in these transistors $45_1$ to $45_{15}$ and also in $44_1$ to $44_{15}$. Since there is no cathode heating current in this electron emitting period, there is no substantial potential gradation on the cathode, and therefore electron emission becomes uniform. Of course during the cathode heating period, the current flowing in the first transistor 44j is the line cathode current only, which is about 50 mA per one line cathode 2j, and therefore, the first transistor 44j of a moderate size. Since the current in the resistor 42j flows only during the cathode heating period, the resistance can be determined solely for the cathode heating current, and power loss in the resistor 42j can be also very small. Besides, other equivalent switching element or composit switching circuit may be used instead of the same type transistors.

Figure 10:
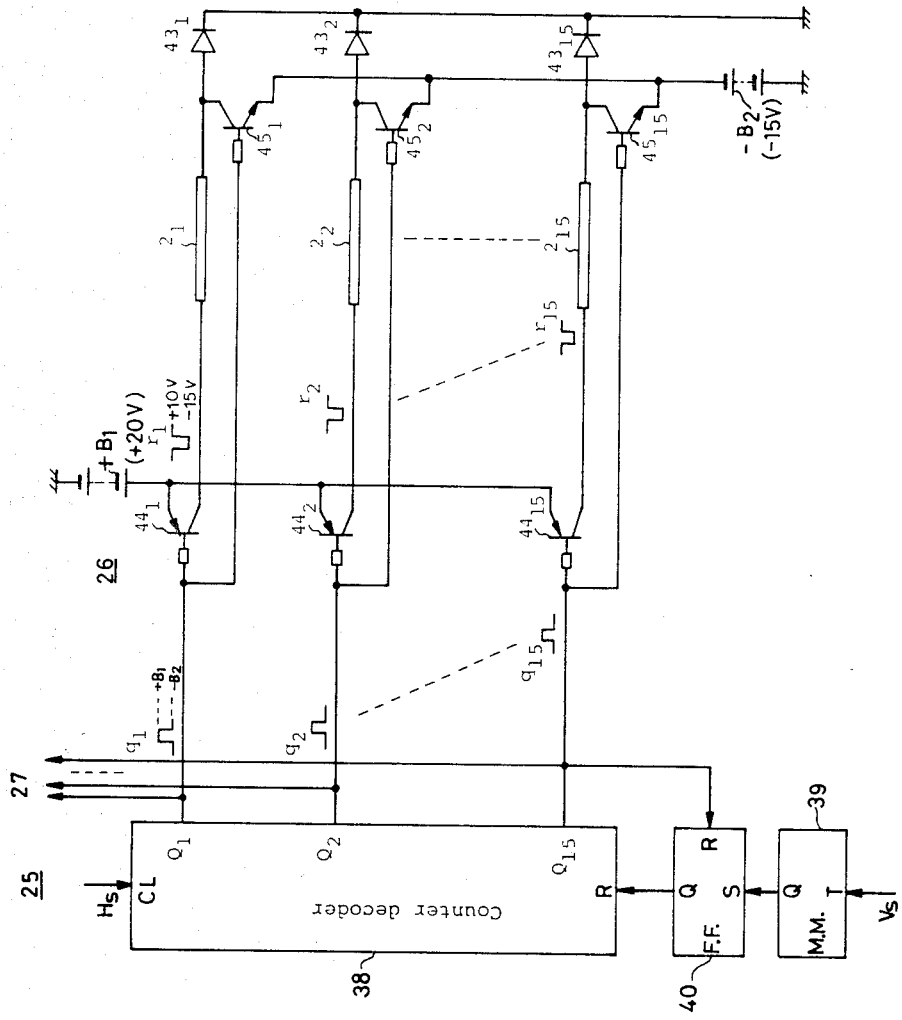
FIG. 10 is a circuit diagram of a fourth example of the present invention.

FIG. 10 shows a fourth example which is a modification from that of FIG. 9. Parts corresponding to those of the foregoing examples of FIG. 6, FIG. 8 and FIG. 9 are shown by the same numerals. The circuit of FIG. 10 has 15 sets of circuit, each comprising two switching transistors, namely, a first transistor 44j of PNP type and a second transistor 43j of NPN type. The first transistor 44j is connector by the collector to one end of a line cathode 2j, by the emitter to a positive power source +B1 and by the base through a resistor to an output terminal Qj of the counter decoder 38. The second transistor 45j is connected by the collector through a resistor $42_1$ to the other end of the line cathode 2j which is grounded through a resistor 43j, by the emitter to a negative power source −B2 and by the base to the output terminal Qj. In this example, by suitably selecting the resistance of the line cathodes $2_1$ to $2_{15}$, the resistors $42_1$ to $42_{15}$ used in FIG. 9 is dispensed with the present example, but diodes $43_1$ to $43_{15}$ should be provided instead of the resistors $42_1$ to $42_{15}$. Such diodes are very easy to provide in an IC or LSI. The other ends of the positive power source +B1 and the negative are also grounded. The above-mentioned same connections are repeated for 15 sets of the circuits.

The bases of the transistors 45j and 46j receive vertical driving pulses qj. The operation of this example is substantially the same as that of FIG. 9.

Figure 11:
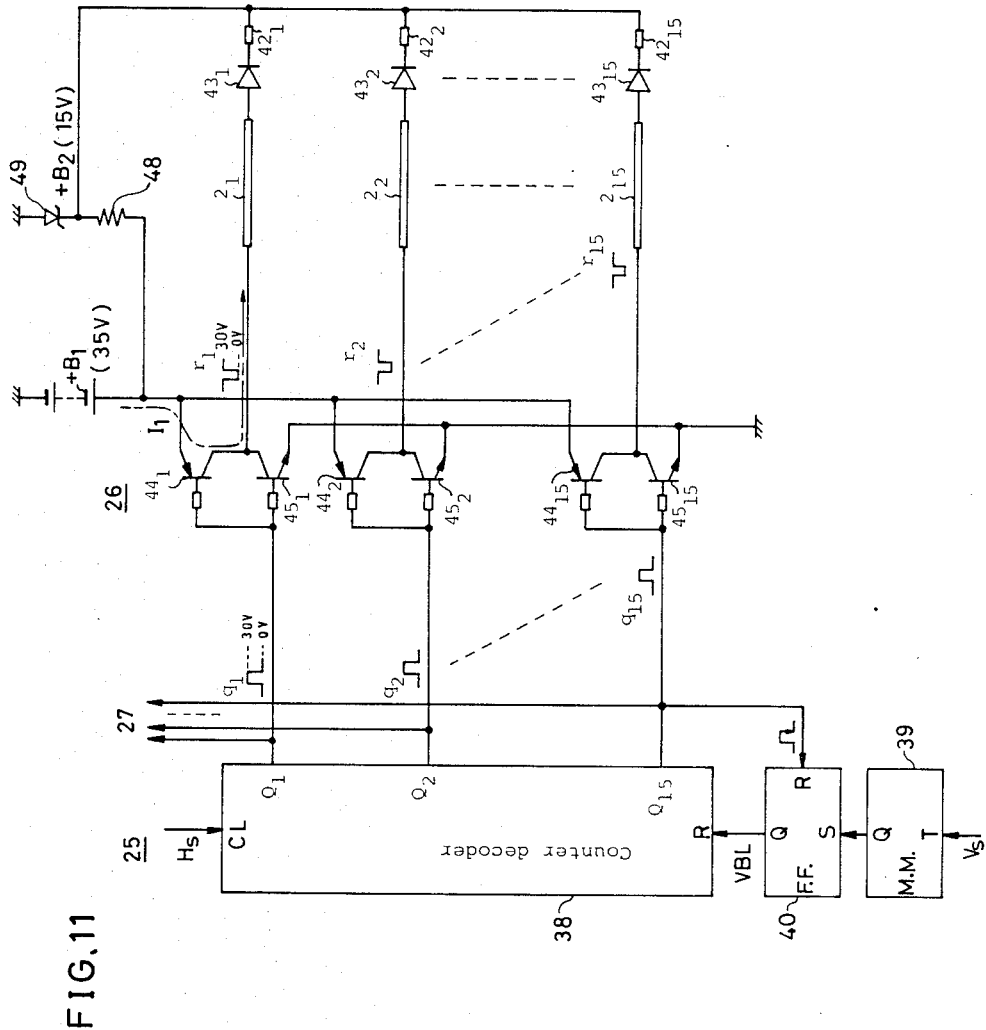
FIG. 11 is a circuit diagram of a fifth example of the present invention.

FIG. 11 shows a fifth example embodying the present invention. Corresponding parts to those of the foregoing examples of FIG. 6, FIG. 8, FIG. 9 and FIG. 10 are shown by the same numerals. The circuit of FIG. 11 has 15 sets of circuit each comprising two switching transistors, namely a first transistor 44j of PNP type and a second transistor 45j of NPN type, one line cathode 2j and one series connected diode 43j. In each set, the first (PNP) transistor 44j and the second (NPN) transistor 45j are connected to form a push-pull circuit. The first (PNP) transistor 44j is connected by the emitter to a positive power source +B1, by the collector of the collector of the second (NPN) transistor 45j and by the base through a resistor to the output terminal Qj of a counter decoder 38. The second (NPN) transistor 45j connected by the emitter to the ground or negative terminal of the power source and by the base through a resistor to the output terminal Qj. One end of the line cathode 2j is connected to the common connected collector of the first transistor 44j and the second transistor 45j, and the other end of the line cathode is connected through series connection of a diode 43j and a resistor 42j to a voltage divided point +B2', which is junction point between a resistor 48 and a constant voltage diode 49 connected to the positive terminal of the power source +B1 and the negative terminal of the power source or ground, respectively.

The bases of the transistors 44j and 45j receive vertical driving pulses $q_j$. During the low level period (that is a heating period for the line cathode 2j) of the pulse $q_j$, the second transistor 45j is cut off, and the first transistor 44j is conductive. Accordingly, a heating current Ij is lead, as shown by a chain line for $I_1$, through the first transistor 44j and the line cathode 2j and through the diode 43j and the resistor 42j to the divided point +B2. On the contrary, during high level period (that is an electron emission period for the line cathode 2j) of the pulse $q_j$, the second transistor 45j is conductive and the first transistor 44j is cut off, thereby the line cathode 2j is held at the potential of the divided point +B2 which is lower than that of positive terminal of the power source +B1, thereby making the diode 43j cut off. Therefore, the heating current is cut off during the short period of the pulse $r_j$, and at the same time the line cathode 2j emits electrons since the line cathode 2j is held at a low potential with respect to the back electrode 1. In the circuit of FIG. 8, the transistor 44j is cut off in the electron emitting period, and therefore there is no wasteful flowing of current from the positive terminal to the negative terminal of the power source +B1. Therefore, the current through the second transistor 45j at the time of this electron emitting period is very small one which is the current of the electron emission. Therefore the transistors $45_1$ to $45_{15}$ can be of small current type, and there are no substantial current loss, hence no power loss, in these transistors $45_1$ to $45_{15}$ and $45_1$ to $45_{15}$. Since there is no cathode heating current in this electron emitting period, there is no substantial potential gradation on the cathode, and therefore electron emission becomes uniform. Of course during the cathode heating period, the current flowing in the first transistor 44j is the line cathode current only, which is about 50mA per one line cathode 2j, and therefore, the first transistor 44j of a moderate size. Since the current in the resistor 42j flows only during the cathode heating period, the resistances can be determined solely for the cathode heating current, and power loss in the resistor 42j can be also very small.

Besides the above-mentioned use of transistors as switching elements, other switching elements such as FET, thyristor and composite switching elements comprising plural elementary semiconductor elements on semiconductor IC can be used.

The present invention is advantageous in that switching elements of small capacity or small size and cheap cost can be used and power consumption in the transistors and resistors can be drastically reduced. Therefore, the switching circuit parts of the image display apparatus can be made on an IC.

What is claimed is:

1. An image display apparatus comprising:
    a phosphor screen,
    an electron beam source having a first predetermined number of line cathode for in turn emitting said first predetermined number of horizontal rows of electron beams, each row having a second predetermined number of rod shaped electron beams,
    horizontal deflection means for horizontal deflections of said electron beams,
    vertical deflection means for vertical deflections of said electron beams of the horizontal rows and electron beams for controlling said electron beams,
    characterized by further comprising,
    switch pair means of said first predetermined number, each switch pair means being for controlling heatings and electron emissions of corresponding one of said line cathodes and comprising each other oppositely working first switching means and second switching means, said first switching means being for switching cathode heating current from a first power source and said second switching means being for switching cathode bias voltage from a second power source to bias a selected cathode and
    control means for controlling said switch pair means by giving control signals to said switch pair means thereby closing said first switch and opening said second switch to in turn make the line cathode to emit electrons.

2. An image display apparatus in accordance with claim 1, wherein said first switching means and said second switching means are semiconductor switching devices of each other opposite conductivity type.

3. An image display apparatus in accordance with claim 2, wherein:
    said first switching means and said second switching means are connected in series to form a push-pull circuit,
    one end of the series connected switching means is connected to said first power source,
    the other end of said series connected switching means is connected to said second power source,
    an intermediate junction points of said series connected switching means being connected to one end of a series-connection of said line cathode and a diode,
    and the other end of said series-connection being connected to the other ends of said first power source and said second power source.

4. An image display apparatus in accordance with claim 2, wherein
    one end of said first switching means is connected to said first power source,
    the other end of said first switching means is connected to one end of said line cathode,
    one end of said second switching means is connected to said second power source and
    the other end of said first switching means is connected to the other end of said line cathode, said the other end of said line cathode being connected to the other ends of said first power source and said second power source through a resistor or a diode which is forward with respect to said first power source.

5. An image display apparatus in accordance with claim 2, wherein
- a first resistor, said first switching means and said second switching means which is of the same conductivity as that of said first conductivity are connected in series each other,
- one end of said series connection is connected to said first power source,
- the other end of said series connection is connected to said second power source and
- a third switching means and a second resistor are connected in series, and a free end of said second resistor is connected to said first power source,
- a free end of said third switching means is connected to said second power source, and
- a junction point between said second resistor and said third switching means being connected to a control signal electrode of said first switching means and
- means to give vertical driving pulse is connected to give said vertical driving pulse to control signal electrodes of said second switching means and said third switching means, and
- one end of a series connection of said line cathode and a diode which is forward with respect to said first power source is connected to said junction point, and the other end of this series connection is connected to the other end of said first power source and the other end of said second power source.

6. An image display apparatus in accordance with claim 1, wherein said first switching means and said second switching means are semiconductor switching devices of the same conductivity type, either one of said first switching means or said second switching means having means to invert the polarity of its input signal.

7. An image display apparatus in accordance with claim 6, wherein
- said first switching means and said second switching means are connected in series to form a push-pull circuit,
- one end of the series connected switching means is connected to said first power source,
- the other end of said series connected switching means is connected to said second power source,
- an intermediate junction points of said series connected switching means being connected to one end of a series-connection of said line cathode and a diode,
- and the other end of said series-connection being connected to the other ends of said first power source and said second power source.

8. An image display apparatus in accordance with claim 6, wherein
- one end of said first switching means is connected to said first power source,
- the other end of said first switching means is connected to one end of said line cathode,
- one end of said second switching means is connected to said second power source and
- the other end of said first switching means is connected to the other end of said line cathode, said the other end of said line cathode being connected to the other ends of said first power source and said second power source through a resistor or a diode which is forward with respect to said first power source.

9. An image display apparatus in accordance with claim 6, wherein
- a first resistor, said first switching means and said second switching means which is of the same conductivity as that of said first conductivity are connected in series each other,
- one end of said series connection is connected to said first power source,
- the other end of said series connection is connected to said second power source and
- a third switching means and a second resistor are connected in series, and a free end of said second resistor is connected to said first power source,
- a free end of said third switching means is connected to said second power source, and
- a junction point between said second resistor and said third switching means being connected to a control signal electrode of said first switching means and
- means to give vertical driving pulse is connected to give said vertical driving pulse to control signal electrodes of said second switching means and said third switching means, and
- one end of a series connection of said line cathode and a diode which is forward with respect to said first power source is connected to said junction point, and the other end of this series connection is connected to the other end of said first power source and the other end of said second power source.

10. An image display apparatus in accordance with claim 1, wherein
- said second power source is an intermediate potential terminal of potential dividing means connected across both ends of said first power source,
- said first switching means is connected between one end of said line cathode and one end of said first power source,
- said second switching means is connected between said one end of said line cathode and the other end of said first power source and
- the other end of said line cathode is connected to said intermediate potential terminal.

11. An image display apparatus in accordance with claim 10 wherein
- one end of said first switching means is connected to said first power source,
- the other end of said first switching means is connected to one end of said line cathode,
- one end of said second switching means is connected to said second power source and
- the other end of said first switching means is connected to the other end of said line cathode, said the other end of said line cathode being connected to the other ends of said first power source and said second power source through a resistor or a diode which is forward with respect to said first power source.

12. An image display apparatus in accordance with claim 10, wherein
- said first switching means and said second switching means are connected in series to form a push-pull circuit,
- one end of the series connected switching means is connected to said first power source,
- the other end of said series connected switching means is connected to said second power source,
- an intermediate junction points of said series connected switching means being connected to one end of a series-connection of said line cathode and a diode, and the other end of said series-connection being connected to the other ends of said first power source and said second power source.

13. An image display apparatus is accordance with claim 10, wherein
one end of said first switching means is connected to said first power source,
the other end of said first switching means is connected to one end of said line cathode,
one end of said second switching means is connected to said second power source and
the other end of said first switching means is connected to the other end of said line cathode, said the other ends of said first power source and said second power source through a resistor or a diode which is forward with respect to said first power source.

14. An image display apparatus in accordance with claim 10, wherein
a first resistor, said first switching means and said second switching means which is of the same conductivity as that of said first conductivity are connected in series each other,
one end of said series connection is connected to said first power source,
the other end of said series connection is connected to said second power source and
a third switching means and a second resistor are connected in series, and a free end of said second resistor is connected to said first power source,
a free end of said third switching means is connected to said second power source, and
a junction point between said second resistor and said third switching means being connected to a control signal electrode of said first switching means and
means to give vertical driving pulse is connected to give said vertical driving pulse to control signal electrodes of said second switching means and said third switching means, and
one end of a series connection of said line cathode and a diode which is forward with respect to said first power source is connected to said junction point, and the other end of this series connection is connected to the other end of said first power source and the other end of said second power source.

15. An image display apparatus in accordance with claim 1, wherein
said first switching means and said second switching means are connected in series to form a push-pull circuit,
one end of the series connected switching means is connected to said first power source,
the other end of said series connected switching means is connected to said second power source,
an intermediate junction points of said series connected switching means being connected to one end of a series-connection of said line cathode and a diode,
and the other end of said series-connection being connected to the other ends of said first power source and said second power source.

16. An image display apparatus in accordance with claim 1, wherein
said first switching means and said second switching means are of each other opposite conductivity types and connected in series through a resistor inserted inbetween to form a push-pull circuit,
one end of the series connected switching means is connected to said first power source,
the other end of said series connected switching means is connected to said second power source,
one end of a series-connection of said line cathode and a diode which is forwards with respect to said first power source is connected to a junction between said resistor and said collector of the second switching means,
and the other end of said series-connection is connected to the other ends of said first power source and said second power source.

17. An image display apparatus in accordance with claim 1, wherein
a first resistor, said first switching means and said second switching means which is of the same conductivity as that of said first conductivity are connected in series each other,
one end of said series connection is connected to said first power source,
the other end of said series connection is connected to said second power source and
a third switching means and a second resistor are connected in series, and a free end of said second resistor is connected to said first power source,
a free end of said third switching means is connected to said second power source, and
a junction point between said second resistor and said third switching means being connected to a control signal electrode of said first switching means and
means to give vertical driving pulse is connected to give said vertical driving pulse to control signal electrodes of said second switching means and said third switching means, and
one end of a series connection of said line cathode and a diode which is forward with respect to said first power source is connected to said junction point, and the other end of this series connection is connected to the other end of said first power source and the other end of said second power source.

* * * * *